June 24, 1930.  P. A. GOLLNICK ET AL  1,765,527

CLUTCH MECHANISM

Filed April 7, 1928   3 Sheets-Sheet 1

Witnesses
Arthur M. Framke
Wm. C. Anderson

Inventors
Paul R. Gollnick,
John J. Toolan &
George Harred,
By Kummler & Kummler attys.

June 24, 1930. P. A. GOLLNICK ET AL 1,765,527

CLUTCH MECHANISM

Filed April 7, 1928 3 Sheets-Sheet 3

Witnesses
Arthur M. Franke
Wm. C. Anderson

Inventors.
Paul A. Gollnick, John J. Toolan &
George Harred,
By Rummler & Rummler,
Attys.

Patented June 24, 1930

1,765,527

UNITED STATES PATENT OFFICE

PAUL A. GOLLNICK, JOHN J. TOOLAN, AND GEORGE HARRED, OF CHICAGO, ILLINOIS, ASSIGNORS, BY MESNE ASSIGNMENTS, TO SELECTOGRAPH COMPANY, OF CHICAGO, ILLINOIS, A CORPORATION OF ILLINOIS

CLUTCH MECHANISM

Application filed April 7, 1928. Serial No. 268,223.

The main objects of this invention are to provide a clutch having improved means for connecting a driven member with a driving member; to provide improved tripping mechanism for retracting said means to disconnect said members; to provide improved mechanism for retracting said tripping mechanism to permit the operation of said connecting means; to provide an improved manually operable stop for locking said tripping mechanism in its retracted position when it is desired that the driven member operate continuously; and to provide a clutch of this kind which is particularly adapted for use in connection with an addressing machine wherein the clutch is controlled electrically by the usual selector for operating the printing mechanism.

An illustrative embodiment of this invention is shown in the accompanying drawings, wherein:—

Figure 1:
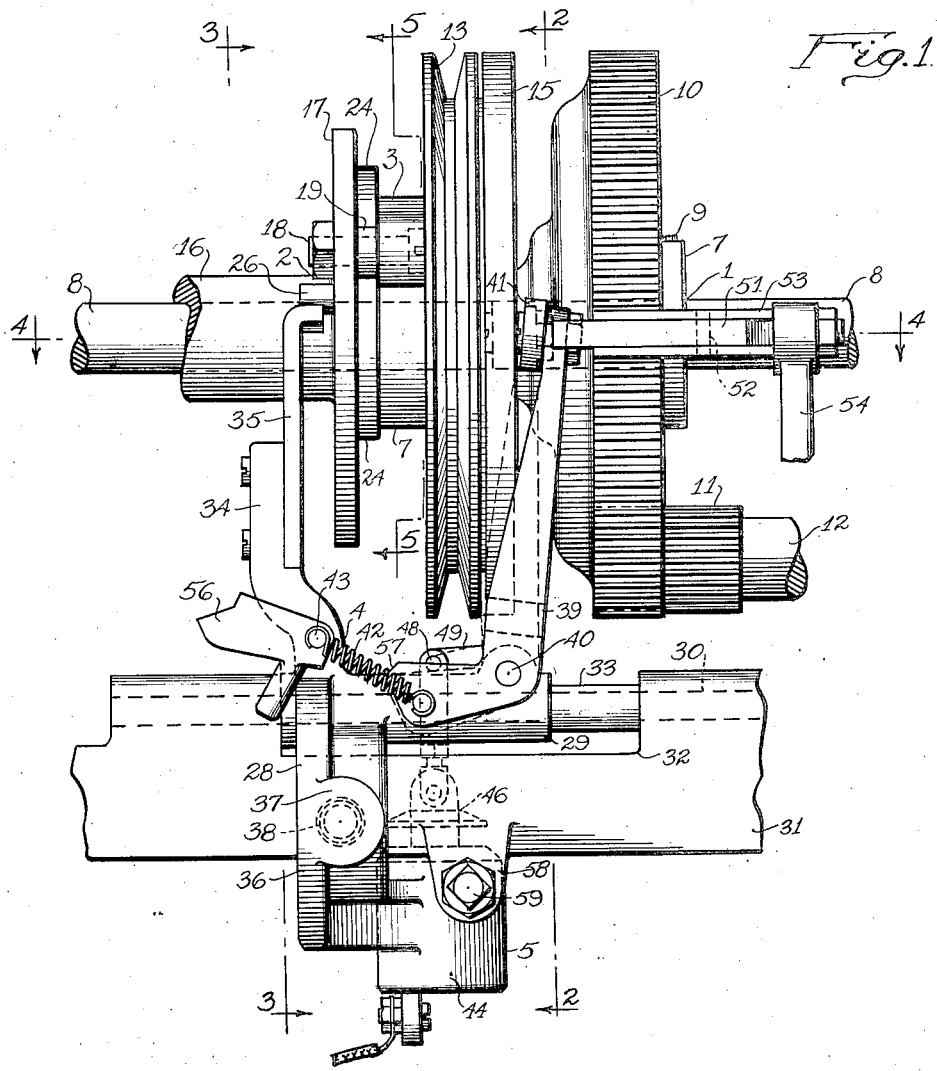
Figure 1 is a side elevation of an improved clutch mechanism, parts being shown in dotted outline.
Figure 8:
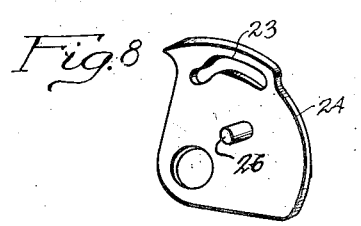
Figs. 8 and 9 are details in perspective of the cam and detent, respectively, shown in Figs. 5 and 6.
Figure 9:
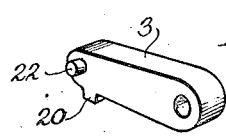

A clutch embodying this invention is adapted for use in connection with many different types of machines and, therefore, some of those parts which are not necessary to a complete understanding of the invention have been omitted from the drawings.

In the form shown, the improved clutch comprises rotatable driving and driven members 1 and 2 respectively adapted to be connected together by improved interlocking means 3 arranged to be normally held inoperative for disconnecting the members 1 and 2 by a tripping mechanism 4 which is intermittently retracted so as to release the interlocking means by an improved mechanism 5.

In the form shown, the driving member 1 comprises a casting 6 having a hub part 7 fixed on a shaft 8 by a set screw 9 and having a gear part 10 meshing with a pinion 11 fixed on a drive shaft 12.

Also integrally formed on the hub part 7, is a pulley 13 to which a belt may be connected for driving some part of the machine, not shown, to which the clutch is applied. Secured to the pulley 13 by screws 14 or other suitable fastening means, is an annular cam 15 adapted to retract the tripping mechanism 4 as hereinafter described. The outer periphery of the cam 15 has a portion 15.1 which is substantially concentric with the shaft 8 and has a pair of inclined approaches 15.2 and 15.3 located on respectively opposite sides of an opening 15.4.

In the embodiment illustrated, the driven member 2 comprises a sleeve 16 loosely supported on the shaft 8 and arranged to drive the part of the machine which is controlled by the improved clutch mechanism. When the clutch is used in connection with an addressing machine, the sleeve 16 is arranged to drive the printing mechanism. Formed on the inner end of the sleeve 16, is an annular flange 17 adapted to be connected to the driving member 1 by the interlocking means 3.

In the construction shown, the interlocking means 3 comprises a detent which is pivotally secured to the flange 17 by a bolt 18 having a washer 19 for spacing the detent from the flange 17. Formed on the end of the detent 3, is a lug 20 adapted to engage a notch 21 formed in the adjacent end of the hub part 7.

Mounted on the free end of the detent, is a pin 22 which rides in a cam groove 23 formed in a cam plate 24 which is rotatably mounted on the shaft 8 and located between the flange 17 and the detent. The cam plate 24 is yieldably connected to the flange 17 by a spring 25 whereby the cam rotates with the driven member 2 and also permits the latter to rotate a limited distance relative to the cam plate. With this improved construction and arrangement of parts, the detent is moved into and out of locking engagement with the notch 21 by the relative rotation of the cam plate 24 and driven member 2. The spring 25 is arranged to pull the cam plate 24 into position for urging the detent 3 into locking engagement with the driving member.

Formed on the cam plate 24, is a pin 26 projecting laterally through an arcuate slot 27, formed in the flange 17, so as to be adapted to engage a part of the tripping mechanism for stopping rotation of the cam plate 24.

In the construction illustrated, the improved tripping mechanism 4 comprises an oscillating carriage 28, having a sleeve part 29 loosely mounted on a horizontal pivot shaft 30 which is supported in a table 31 having a recess 32 for receiving the sleeve part 29. Also mounted on the shaft 30, is a spacing sleeve 33 located between the carriage and one end of the recess 32.

Formed on one end of the sleeve part 29, is an upstanding bracket 34 which supports a tripper arm 35 adapted to engage the stop pin 26 for securing the cam plate 24 against rotation. Depending from the sleeve part 29, is a bracket 36 having a bearing part 37 for receiving one end of a spring 38 which also bears against the table part 31 for normally urging the tripper arm 35 into position to engage the stop pin 26.

Figure 2:
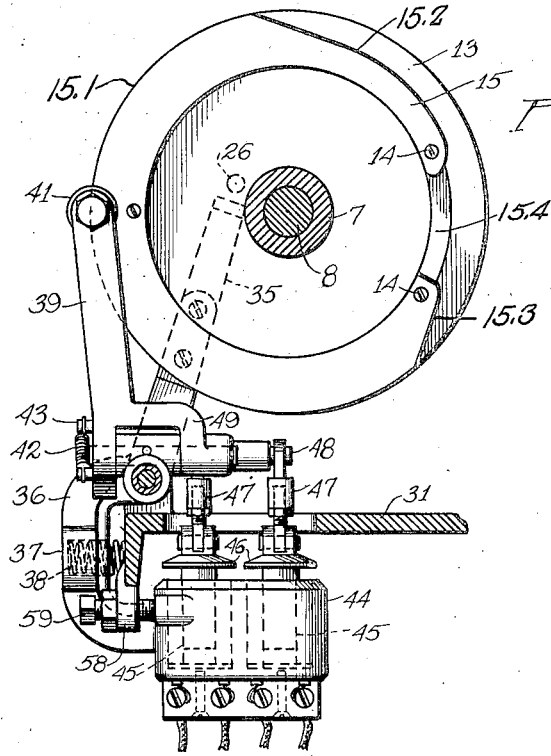
Fig. 2 is a vertical section of the same on a reduced scale, the view being taken on the line 2—2 of Fig. 1.
Figure 3:
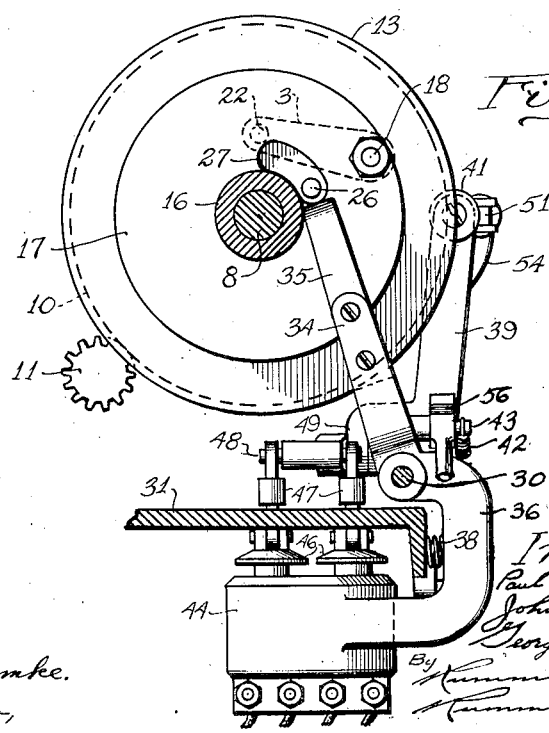
Fig. 3 is a vertical section, taken on the line 3—3 of Fig. 1.
Figure 5:
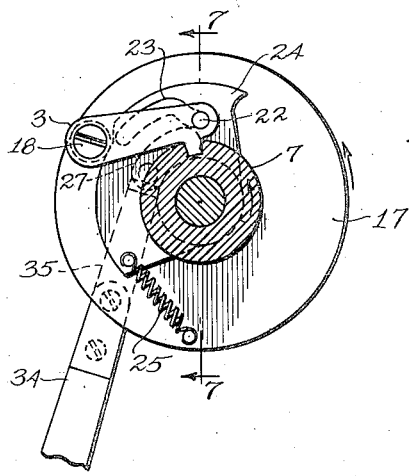
Fig. 5 is a transverse section, taken on the line 5—5 of Fig. 1, and showing the parts as they appear when the tripper arm has just engaged the stop pin of the cam plate, immediately prior to the disconnection of the driven member.

Also mounted on the carriage 28, is a bell crank lever 39 which is pivotally secured to the sleeve part 29 by a pin 40. Supported on the upper end of the lever 39, is a roller 41 adapted to ride on the surfaces 15.2 and 15.1 of the rotary cam 15 for partially rotating the carriage 28, counter-clockwise as viewed in Fig. 2, thereby retracting the tripper arm 35 to permit the detent 3 to engage the notch 21.

The roller 41 is normally urged out of the plane of the cam 15 by a spring 42 which acts between the lower arm of the bell crank 39 and a pin 43 mounted on the bracket 34.

The roller 41 is intermittently moved into the plane of the cam 15 by the mechanism 5 which includes an electromagnetic device supported in a housing 44 formed on the lower end of the bracket 36. When the clutch is used in connection with an addressing machine, the electromagnetic device may be controlled by the usual selector mechanism.

In the form shown, the electro-magnetic device comprises a pair of electro-magnets having cores 45 provided at their upper ends with yokes 46 which are pivotally connected to the lower ends of links 47. The upper ends of the links 47 are pivotally connected to a pin 48 formed on one end of a yoke 49 which is formed on the lower end of the lever 39.

The electromagnetic device acts only momentarily upon each operation and, therefore, after electromagnets have shifted the lever 39 into position to bring the roller 41 into the plane of the cam 15, it is necessary to have other means for securing the lever 39 against return movement under the action of the spring 42 while the cam 15 makes substantially a complete revolution.

In order to secure the roller 41 against disengagement from the cam 15 while the latter makes substantially a complete revolution, improved retaining means is provided for securing the lever 39 against pivotal movement around the pin 40 until the roller reaches the opening 15.4 in the cam.

Figure 4:
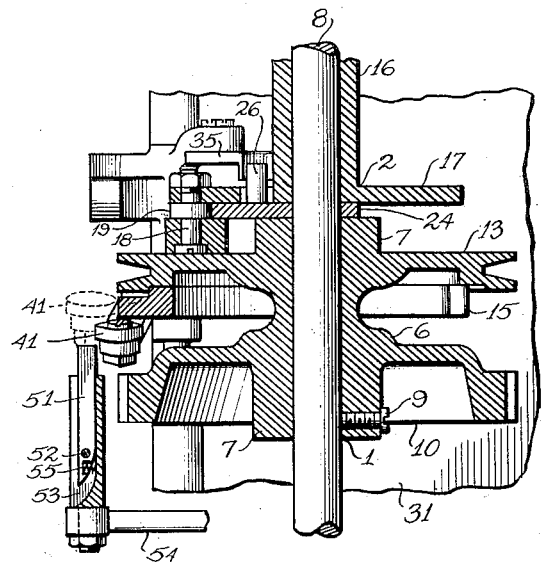
Fig. 4 is a horizontal section, taken on the line 4—4 of Fig. 1.
Figure 7:
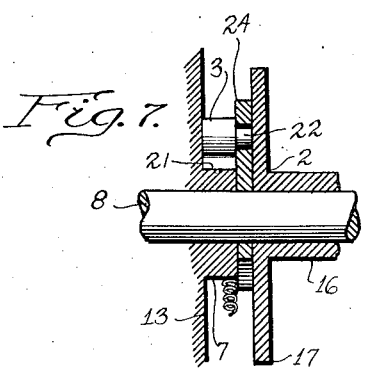
Fig. 7 is a transverse section taken on the line 7—7 of Fig. 5.

In the construction illustrated, the retaining means comprises a stop 51 pivotally mounted on a pin 52 supported in a channel shaped housing 53 mounted on a bracket 54. Bearing between the housing 53 and the inner end of the stop 51, is a spring 55, which yieldingly holds the stop in the position shown in Fig. 4, so that, when the roller 41 rides on the surface 15.1 of the cam 15, the outer extremity of the stop 51 bears against the lever 39 at a point directly behind the roller 41, as shown in dotted outline in Fig. 4.

In some cases it may be desirable that the driven member 2 operate continuously instead of intermittently, and for this purpose a latch 56 is provided for holding the lever 39 against rocking movement around its pivot 40 while the roller 41 is positioned in the plane of the cam 15. The latch 56 is pivoted on the pin 43 so as to be movable into position to bear against a shoulder 57 formed on the lower end of the lever 39, thereby securing the lever in the position shown in dotted outline in Fig. 1. When the lever 39 is held by the latch 56 in the position shown in dotted outline in Fig. 1, the roller 41 is in the path of the cam 15 and, therefore, the tripping mechanism 4 is oscillated continuously on the shaft 30, thereby permitting the driven member 2 to be actuated upon each rotation of the driving member 1.

Depending from the table 31, is a lug 58 on which is mounted a set screw 59 forming a stop engaging in the housing 44 to limit the oscillation of the carriage 28.

Figure 6:
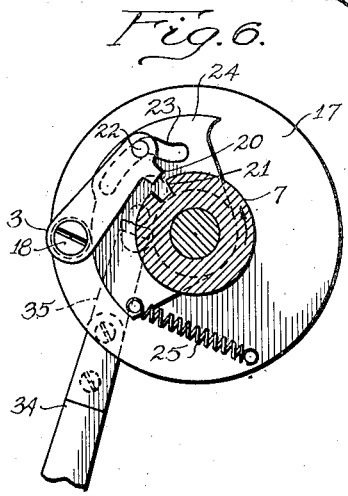
Fig. 6 is a view similar to Fig. 5, but showing the detent in its retracted position for disconnecting the driven member from the driving member.

In operation, the driving member 1 rotates continuously. Under the action of the springs 38 and 42, the tripping mechanism 4 is normally held in its operative position, shown in Fig. 1, with the tripper arm 35 engaging the stop pin 26 to secure the cam plate 24 against rotation and thereby retract the detent 3 as shown in Fig. 6.

When the electro-magnetic mechanism 5 is actuated, the lever 39 is rocked around its pin 40 to position the roller 41 in the opening 15.4 of the cam 15. The operations are timed so that the opening 15.4 will always be in position to receive the roller 41 when the lever 39 moves inwardly. The cam roller 41 then rides upon the surfaces 15.2 and 15.1 of the cam 15, so as to rock the lever 39 and carriage 28 around the shaft 30 as an axis, thereby retracting the tripper arm 35.

Upon the retraction of the arm 35, the spring 25 pulls the cam plate 24 into position to force the detent 3 into locking engagement with the notch 21, whereupon the members 1 and 2 will rotate as a unit. When the roller 41 rides on the cam surfaces 15.2 and 15.1 it is urged outwardly to a position in front of the stop 51 and is thereby held in effective contact with the cam. When the cam 15 has made a complete rotation, the roller 41 moves into the opening 15.4 under the action of the spring 38, and the arm 39 becomes disengaged from the stop 51, thereby permitting the tripping mechanism to return to its initial position as shown in Fig. 1. As soon as the roller 41 moves into the opening 15.4 away from the stop 51, the lever 39 is again retracted to initial position under the action of the spring 42. When the stop pin 26 engages the tripper arm 35, the cam plate 24 stops rotating and the flange 17 continues to rotate for a limited distance, whereby the pin 22 rides in the cam groove 23 for retracting the detent 3 to the position shown in Fig. 6.

In the event it is desirable that the driven member 2 operate continuously, the latch 56 is swung into engagement with the shoulder 57 so as to secure the bell crank lever 39 in position to hold the roller 41 in engagement with the cam 15. When the roller 41 is in constant engagement with the cam 15, the tripping mechanism 4 is rocked continuously, thereby permitting the driven member 2 to be actuated upon each rotation of the driving member 1.

Although but one specific embodiment of this invention has been herein shown and described, it will be understood that numerous details of the construction shown may be altered or omitted without departing from the spirit of this invention as defined by the following claims.

We claim:

1. A device of the class described comprising a driving member, a driven member, means for connecting said members together, a movable carriage, a tripper arm mounted on said carriage and adapted to secure said means in an inoperative position for disconnecting said members, a lever pivoted on said carriage, a cam adapted to engage said lever to move said carriage into position to retract said tripper arm for releasing said means, resilient means normally urging said lever out of the path of said cam, and electro-magnetically controlled mechanism for moving said lever into the path of said cam.

2. A device of the class described comprising a driving member, a driven member, means for connecting said members together, an oscillating carriage, a tripper arm mounted on said carriage and adapted to secure said means in an inoperative position for disconnecting said members, a spring normally urging said carriage into position for disconnecting said members, a lever pivoted on said carriage, a cam adapted to engage said lever to move said carriage into position to retract said tripper arm, resilient means normally urging said lever out of the path of said cam, and mechanism for moving said lever into position to engage said cam.

3. A device of the class described comprising a driving member, a driven member, means for connecting said members together, tripping mechanism adapted to secure said means in an inoperative position for disconnecting said members, a cam on said driving member adapted to retract said tripping mechanism to permit the release of said means for connecting said members, and a manually operable stop for holding said tripping mechanism in position to be actuated by said cam.

4. A device of the class described comprising a driving member, a driven member, means for connecting said members together, a movable carriage, a tripper arm mounted on said carriage and adapted to secure said means in an inoperative position for disconnecting said members, a lever pivoted on said carriage, a cam on said driving member adapted to engage said lever to move said carriage into position to retract said tripper arm for releasing said means, and retaining means arranged to secure said lever against accidental disengagement from said cam during a predetermined movement of said driving member.

5. A device of the class described comprising rotatable driving and driven members, means for connecting together said members, tripping mechanism adapted to secure said means in an inoperative position for disconnecting said members, a cam on said driving member adapted to retract said tripping mechanism to permit the release of said means for connecting said members, and retaining means arranged to secure said tripping mechanism against accidental disengagement from said cam during substantially one revolution of said driving member.

Signed at Chicago this 4th day of April, 1928.

PAUL A. GOLLNICK.
JOHN J. TOOLAN.
GEORGE HARRED.